J. B. MELTZ.
PASTRY MAKING MACHINE.
APPLICATION FILED JUNE 24, 1919.
1,379,643.
Patented May 31, 1921.
4 SHEETS—SHEET 1.
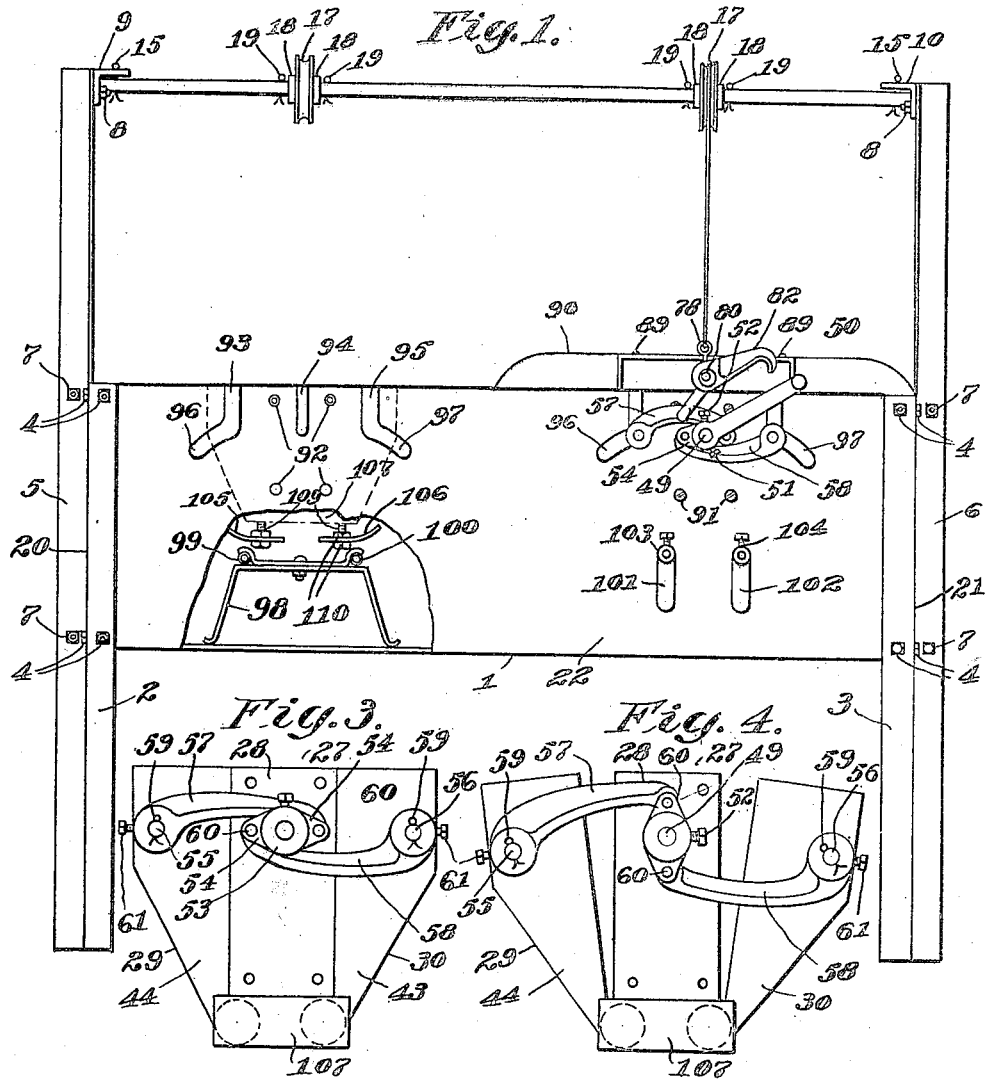
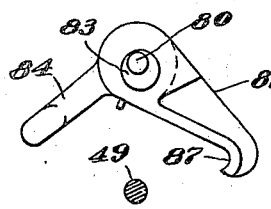
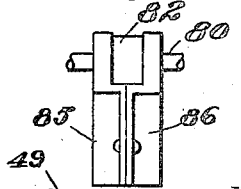
Inventor
Julius B. Meltz
by Roberts, Roberts & Cushman
his Attorneys J. B. MELTZ.
PASTRY MAKING MACHINE.
APPLICATION FILED JUNE 24, 1919.
1,379,643.
Patented May 31, 1921.
4 SHEETS—SHEET 2.
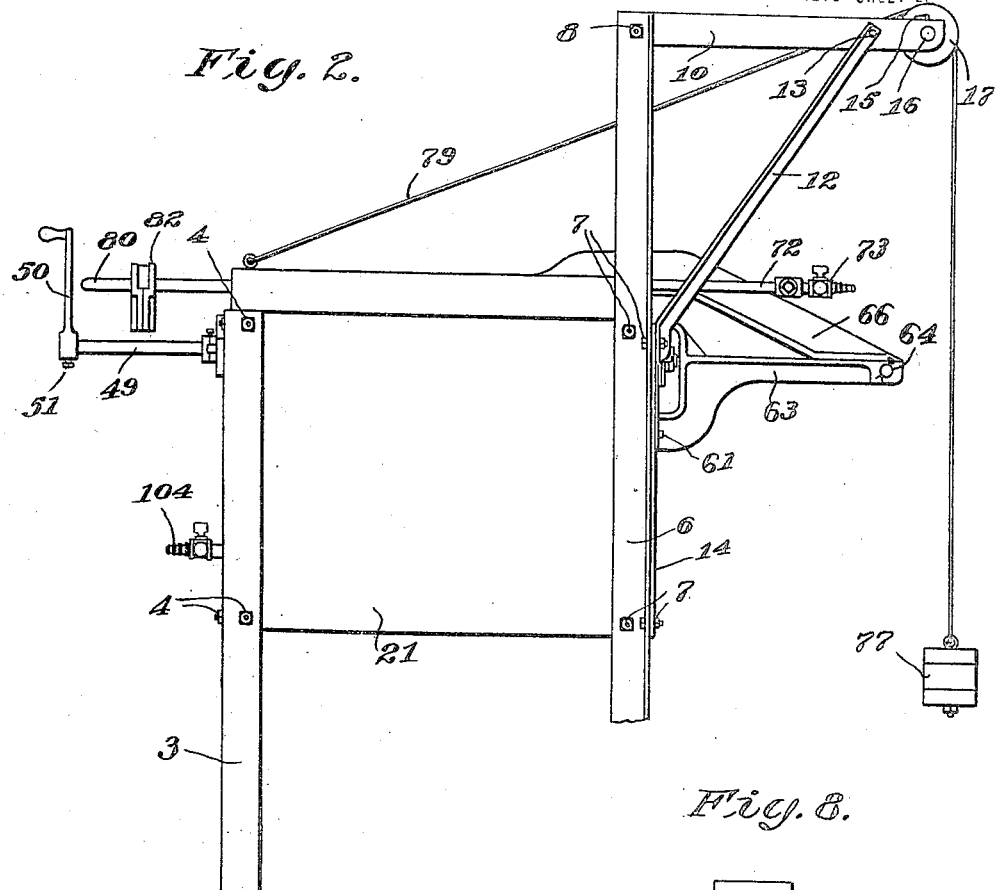
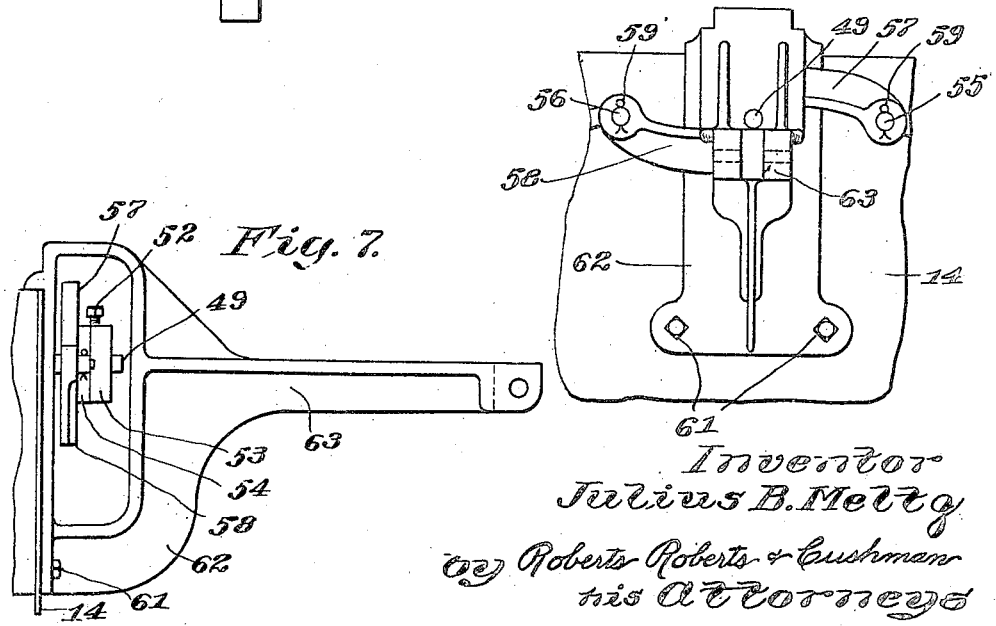
Inventor
Julius B. Meltz
by Roberts Roberts & Cushman
his Attorneys

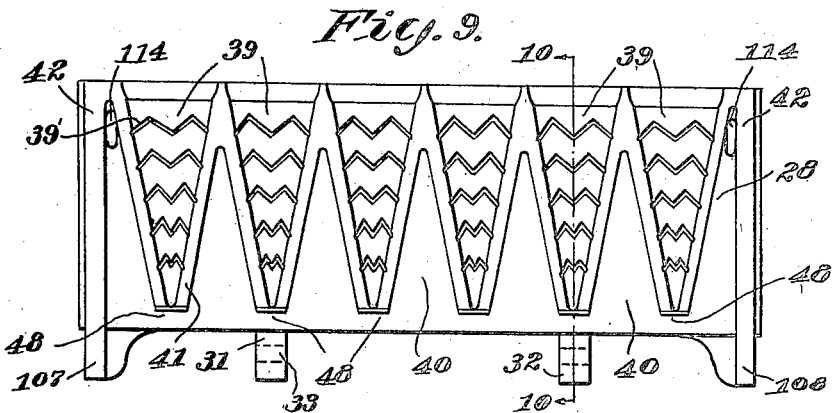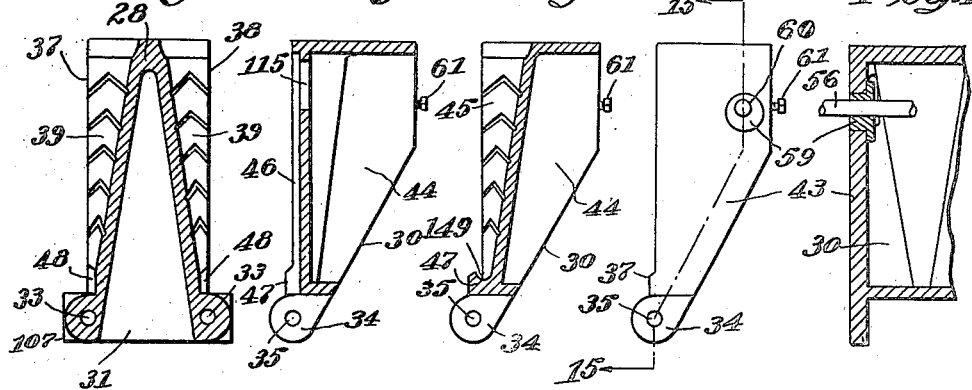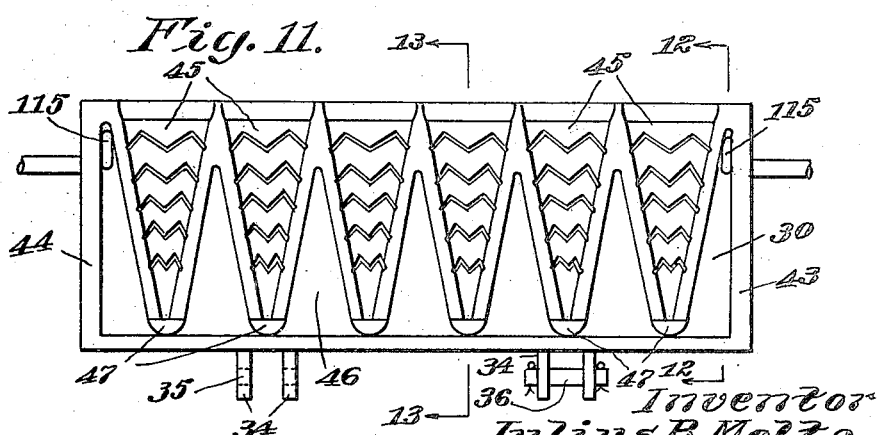

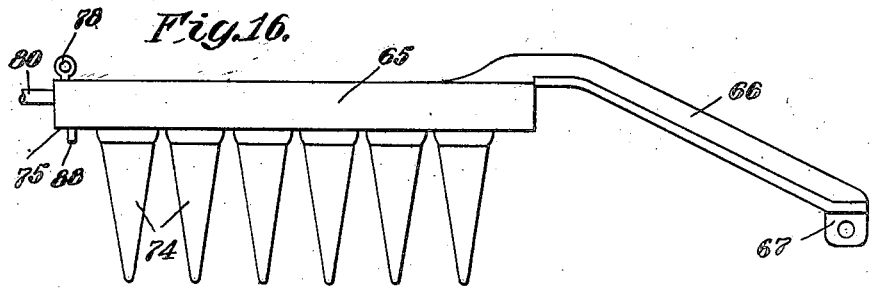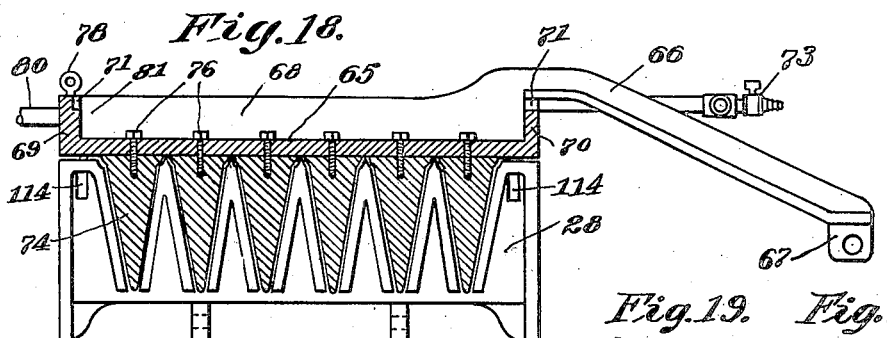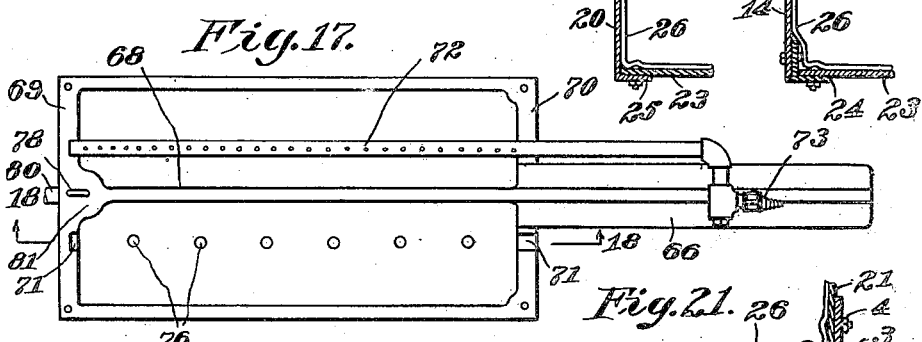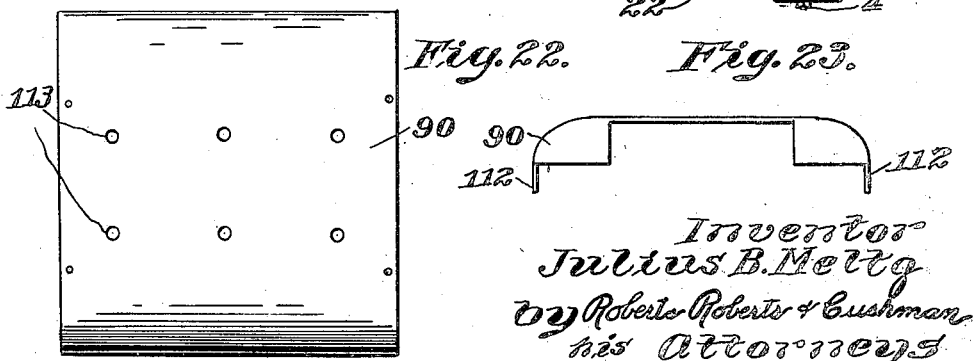

UNITED STATES PATENT OFFICE.

JULIUS B. MELTZ, OF EVERETT, MASSACHUSETTS, ASSIGNOR TO THE EVERETT MACHINE AND MANUFACTURING COMPANY, OF EVERETT, MASSACHUSETTS, A CORPORATION OF MASSACHUSETTS.

PASTRY-MAKING MACHINE.

1,379,643.                Specification of Letters Patent.        Patented May 31, 1921.

Application filed June 24, 1919. Serial No. 306,356.

*To all whom it may concern:*

Be it known that I, JULIUS B. MELTZ, citizen of the United States of America, and resident of Everett, in the county of Middlesex and State of Massachusetts, have invented new and useful Improvements in Pastry-Making Machines, of which the following is a specification.

This invention relates to molding machines for making pastry and more particularly to machines for making ice-cream cones.

An object of the invention is to provide an improved construction for machines for making ice-cream cones. A further object is to provide an improved construction for molds for such a machine, the parts of which are so connected and arranged that the completed cones may be readily and quickly removed from the molds. A further object is to provide means for conjunctively opening a plurality of molds for the removal of completed cones and for conjunctively closing the same. A still further object is the provision of a supporting means serving as an oven in which a plurality of mold units may be assembled. A further object is the provision of improved means for locking the sections of the mold together under pressure. Further objects of the invention will appear from the description hereinafter.

In one aspect the invention involves the provision of a supporting trough serving as a heat insulated oven in which a plurality of mold units may be assembled, the oven being provided with a plurality of burners for each mold unit for baking the pastry molded therein. Each mold unit is provided with a cover section, the covers being so positioned side by side as to inclose the molds within the trough when the covers are all closed.

In another aspect the invention involves the provision of an improved mold construction, comprising a central fixed flask member and movable coöperating flask members disposed on either side of the fixed member and pivoted thereto. The flask members are provided with half conical mold depressions in their meeting faces so disposed as to form two series of conical molds when the movable flask members are closed against the fixed member. These movable flask members are connected by links to a common rock shaft so that they are conjunctively closed and opened by movement of the shaft. A core plate having depending conical cores adapted to enter the mold depressions is pivoted to a rearwardly extending bracket bolted to the fixed member of the flask. This core plate is suitably counterbalanced to enable it to be more easily operated.

In another aspect the invention involves the provision of an improved means for locking the core plate in association with the mold flask which comprises a latching dog pivoted on the core plate and engaging the flask closing rock shaft. This dog has an eccentric cam connection to the core plate of such nature that the core plate may be locked to the flask under pressure.

In a further aspect the invention involves the provision of a stripper finger on one member of the mold whereby when the mold is opened the completed cone is stripped from the mold and can be readily removed therefrom. This stripper finger preferably forms the entire conical tip of the mold.

In order that the nature of my invention may be more clearly understood I have illustrated an embodiment thereof in the accompanying drawings, in which, Figure 1 is a front elevation of my improved ice-cream cone making machine, one molding unit and a portion of the front of the machine being shown broken away to better illustrate portions of the machine;

Fig. 2 is an end elevation of the machine;

Fig. 3 is an end view of the mold flask in closed position;

Fig. 4 is a similar view of the flask in partially opened position;

Fig. 5 is a detail front view of the mold locking means;

Fig. 6 is a side view of the locking means;

Fig. 7 is a side view of the bracket to which the mold core plate is pivoted;

Fig. 8 is a fragmentary view of a portion of the rear side of the machine showing the rear links for opening and closing the mold;

Fig. 9 is a side elevation of the stationary or fixed member of the mold flask;

Fig. 10 is a section on line 10—10 of Fig. 9;

Fig. 11 is a side elevation of one of the movable members of the flask;

Fig. 12 is a section on line 12—12 of Fig. 11;

Fig. 13 is a section on line 13—13 of Fig. 11;

Fig. 14 is an end elevation of the flask member shown in Fig. 11;

Fig. 15 is a fragmentary section taken on line 15—15 of Fig. 14;

Fig. 16 is a side elevation of the core plate of my improved machine;

Fig. 17 is a top plan view of the core plate showing one of the heating burners in place;

Fig. 18 is a section taken on line 18—18 of Fig. 17 showing in addition the core plate associated with the stationary portion of the flask;

Fig. 19 is a section through the seam joining the end and bottom of the oven;

Fig. 20 is a section through the seam joining the back and bottom of the oven;

Fig. 21 is a section through one of the vertical corner seams of the oven;

Fig. 22 is a top view of one of the oven covers; and

Fig. 23 is an end view of the oven cover.

Referring particularly to Figs. 1 and 2, my improved cone machine comprises a rectangular oven 1 preferably constructed of heavy gage sheet iron supported at its front vertical edges by angle iron supports 2 and 3 bolted thereto by bolts 4. The oven is supported at its rear vertical edges by angle iron supports 5 and 6 secured to the oven by bolts 7 or other suitable means. The rear supports extend upwardly beyond the open top of the oven and have rearwardly extending arms 9 and 10 attached thereto by bolts 8 which arms are held in a horizontal position by braces 12 attached to the arms 8 and 9 by bolts 13 and to the supports 5 and 6 by bolts 7 which also secure the rear supports to the rear wall 14 of the oven. Mounted in the ends of horizontal arms 9 and 10 and secured thereto by cotter-pins 15 is a rod 16. Positioned on the rod and rotatable thereon for a purpose hereinafter noted are sheave wheels 17. These wheels are prevented from moving longitudinally on the rod by collars 18 and cotter-pins 19.

The oven 1 is formed from sheet iron, the back panel 14 and end panels 20 and 21 being joined by being bolted to the flanges of the rear supports 5 and 6 by bolts 7 and the front panel 22 and end panels being joined as shown in Fig. 21 by being bolted to the inside of the flanges of the front supports 2 and 3 by bolts 4. The supports 2, 3, 5 and 6 thus serve the double purpose of joining the panels together to form the walls of the oven and of supporting the oven. The bottom 23 of the oven is secured to the back 14 and front 22 by being bolted or riveted to the flanges of an angle bar 24 as shown in Fig. 20. The bottom is secured to the end panels 20 and 21 by being bolted or riveted to the horizontal flange 25 formed on the lower edge of such panels as shown in Fig. 19. The entire oven is lined with heat insulating material such as sheet asbestos 26.

As illustrated in Fig. 1, the oven is designed to accommodate two cone molding units, but it is obvious that the oven might be extended in order to accommodate a larger number of units, for example ten.

Each unit comprises a mold flask 27 having a hollow stationary or fixed member 28 and two movable members 29 and 30 hinged or pivoted thereto. To provide suitable hinge members, the member 28 is formed with two transverse lugs 31 and 32 having openings 33, and the movable members 29 and 30 are provided with ears 34 having openings 35. When assembled the ears 34 embrace the ends of lugs 31 and 32 and are pivoted thereon by pintles 36.

The vertical faces 37 and 38 of member 28 are provided with half conical depressions 39 which serve as half molds for molding the outer surface of ice-cream cones. These depressions may be formed with any desired artistic design impressed or embossed on their surfaces as for example the crenulated grooves 39' shown in Fig. 9. The depressions instead of being conical in outline may be of any other desired shape. The faces 37 and 38 are slightly recessed as shown at 40 except at the margins 41 of depressions 39 and at the end margins 42 in order to afford more accurate meeting or parting surfaces for the flask, and are provided with openings 114 to allow heat to pass from the interior of the member 28 through similar openings in members 29 and 30 hereinafter described.

The movable members of the flask shown in detail in Figs. 11 to 15 inclusive are substantially channel shaped in cross section and provided with vertical end walls 43 and 44. These members are provided with half conical depressions 45 of substantially the same shape and design as depressions 39 in the member 28. The parting face of each member 29 and 30 is also slightly recessed as shown at 46 except at the margins of the faces and at the margins of depressions 45, and provided with openings 115 alined with openings 114 in the faces of member 28 when the flask is closed.

To strip the completed cones from the mold depressions when the flask is opened, the movable members 29 and 30 of the flask are provided with stripper fingers or lugs 47 shown in Figs. 11 to 14, and the marginal face is cut away from the bottom of depressions 39 of the stationary member 28 as at 48 an amount corresponding to the area of the lugs. These lugs are provided with semi-spherical depressions 149 as shown in Fig. 13 for molding the tips of the cones. It is thus evident that when the flask is closed the half conical depressions in the fixed and movable members of the flask coöperate to form complete conical molds, and that when the flask is opened, inasmuch as the tips of the cones are entirely molded by the movable sections of the flask, the tips of the cones are stripped away from the stationary member of the mold through the action of the stripper lugs 47.

Journaled in the stationary member 28 of the flask is a rock shaft 49 having an operating handle 50 at its forward end secured to the shaft as by set-screw 51. Secured to the rock shaft at either end of the member 28 by set screws 52 are collars 53. Each collar is provided with oppositely disposed arms 54. Passing longitudinally through the movable flask members 29 and 30 are rods 55 and 56 connected at either end by links 57 and 58 to the arms 54 of collars 53. The links 57 and 58 are held in position on the ends of rods 55 and 56 by any suitable means as by cotter-pins 59 and are pivoted to arms 54 by pintles 60. In Fig. 3 the flask is shown in its closed position with pintles 60 in alinement with shaft 49 and rods 55 and 56. In this position of the members, the links and crank arms 54 constitute toggle-like devices which serve to lock the flask closed. When the shaft 49 is rotated in a counter clockwise direction the links 57 and 58 operate conjunctively to move the movable members of the flask away from the stationary portion as shown in Fig. 4.

In order to insure that the molding faces of the movable members of the flask shall meet the molding faces of the stationary member uniformly, throughout their longitudinal length, the rods 55 and 56 are adjustably mounted in the members 29 and 30. This adjustable mounting comprises bushings 59 mounted in the end walls 43 and 44 of the members 29 and 30 having eccentric openings 60 therein through which the rods pass. These bushings are held in their adjusted positions by set screws 61. Thus by slight rotation of the bushings 59 the rods 55 and 56 may be adjusted with relation to the molding faces of the flask so that the flask closes evenly throughout its length. Secured to the rear end of the stationary member of the flask by bolts 61 is a bracket 62 having an outstanding horizontal arm 63. A core plate 65 is provided with a rearwardly extending arm 66 having an ear 67 and is pivoted to the bifurcated end of arm 63 by a pintle 64 passing through arm 63 and ear 67. The core plate is constructed in the form of a shallow rectangular box having a central longitudinal partition 68. The end walls 69 and 70 of the plate on either side of the partition are provided with recesses 71 in which gas burners 72 are located. Only one of the burners has been shown in position in Fig. 17 but it is obvious that two burners would be used connected to a common gas cock 73. A plurality of conical cores 74 arranged in two series for coöperation with the two series of molds in the flask are secured to the lower surface 75 of the core plate 65 by screws 76. To enable the operator to readily move the core plate into and out of association with the mold flask, the plate is counter balanced by a weight 77 which is connected to the eye bolt 78 in the forward wall 69 of the core plate by a steel cable 79 which passes over sheave wheel 17 hereinbefore described. The core plate is also provided with a forwardly extended handle 80 secured in boss 81 of the plate by which the plate may be raised and lowered.

The core plate is locked into association with the flask by a locking dog 82 which is pivoted to the handle 80 through an eccentric cam bushing 83 which is provided with operating handle 84. The dog is made in two parts 85 and 86 riveted together and embracing cam bushing 83. The cam 83 is so arranged that when the hooked end 87 of the dog has been engaged under rock shaft 49 of the flask and the cam is rotated by handle 84, the core plate and flask are locked together under pressure.

To insure that the core plate shall be accurately positioned relative to the mold flask when in association therewith the plate 65 is provided with dowels 88 which engage in suitable dowel holes in the flask.

Secured to the upper surface of the core plate as by screws 89 is an oven cover 90, shown most clearly in Figs. 1, 22 and 23. This cover is of sufficient extent to cover substantially one half of the top of the oven and is provided at its edges with downwardly extending flanges 112 to prevent the escape of heat between covers and between the cover and the end of the oven. The cover is also provided with air inlets 113 for supplying air to burners 72. It is of course obvious that if a larger machine having more than two molding units were employed the cover would be designed to cover only a proportionate portion of the open side of the oven. These covers being attached to the core plates partake of their pivotal movement and open and close the oven as the plates are raised and lowered, and further act as deflectors to deflect heat from the burners 72 against the core plates.

The entire mold unit comprising the flask and pivotally attached core plate is secured to the forward panel of the oven by screws 91 which pass through holes 92 in the panel. Slots 93, 94, and 95 are provided to enable the unit to be lifted bodily from the oven when the screws 91 have been removed. The slots 93 and 95 are further laterally extended at their lower ends 96 and 97 to allow oscillating movement of rods 55 and 56 to open and close the flask.

Mounted upon detachable supports 98 on the bottom of the oven underneath each mold unit are gas burners 99 and 100 extending through openings 101 and 102 in the front of the oven and having gas cocks 103 and 104 upon their forward ends. To prevent flame from the burners from directly entering the mold where the movable members 29 and 30 pivot on the stationary member 28, flame deflectors 105 and 106 are placed between the burners and mold. These deflectors are secured to the stationary member of the mold by threaded studs 109 depending from end flanges 107 and 108 of member 28, the deflectors being held on the studs by nuts 110.

In the operation of the machine as described the core plate and cores are raised by means of handle 80 and cake batter is poured into the conical mold depressions of the flask. The core plate is then lowered and each core 74 enters a mold depression and is locked therein under pressure by the locking dog 82. The pressure applied by the dog 82 through handled cam 83 causes the batter to be forced through all the space between each core and the mold depression with which it is associated. Heat is then applied to the flask and cores through burners 72, 99 and 100 the heat flowing upwardly from burners 99 and 100 into the hollow member 28 then outwardly through alined openings 114 and 115 to the outside of the flask, until the batter is sufficiently baked. The core plate is then unlocked from the flask and raised out of association therewith, being held in its elevated position by counter weight 77.

Handle 50 is then turned to rock shaft 49 reciprocating links 57 and 58 to swing the movable members of the flask conjunctively away from the stationary member. Through the action of stripper lugs 47 the tips of completed cones are stripped away from the mold thereby loosening the cones so that they may be readily removed. After removal of the cones the flask is again closed by handle 50 in readiness for another molding and baking operation.

It is therefore apparent that I have provided an improved cone making machine having few and simple parts, and easily and efficiently operated. While I have shown my invention as embodied in a machine for molding conical receptacles, it is to be understood that the machine may also be adapted for molding pastry receptacles of other designs by providing flasks and core plates formed in accordance with the desired designs.

I claim:

1. In a pastry machine, a mold comprising a flask having a central fixed member and movable members disposed on either side thereof and pivoted thereto, said members each being provided with half mold depressions on their meeting faces, and manually operable means engaging each of said movable members at the sides thereof and constructed and arranged for simultaneously moving said pivoted members toward and away from said fixed member to close and open said flask.

2. In a pastry machine, a mold comprising a flask having a fixed central member and movable members disposed on either side thereof and pivoted thereto, said fixed member and movable members each being provided with half mold depressions on their meeting faces, and toggle means for simultaneously moving said pivoted movable members toward and away from said fixed member to open and close said flask and to lock the same in closed position.

3. In a pastry machine, a mold comprising a flask having a central fixed member and movable members disposed on either side thereof and pivoted thereto, said members each being provided on their meeting faces with half mold depressions, a rock shaft, and links connecting said shaft and said movable members whereby the movable members may be simultaneously moved toward and away from said fixed member to close and open said flask.

4. In a pastry machine, a mold comprising a double flask having a fixed central member with half mold depressions in opposite faces thereof and movable members one disposed on either side of said central member and pivoted thereto, each said movable member having half mold depressions in the inside face thereof for coöperation with the depressions in said central member when the flask is closed, a rock shaft, and links connecting said shaft and said movable members whereby the movable members may be simultaneously moved toward and away from said fixed member to close and open said flask.

5. In a pastry machine, a mold comprising a flask having a central fixed member and movable members disposed on either side thereof and pivoted to the lower portion thereof, said members being provided on their meeting faces with half mold depressions coöperating when the flask is closed to form complete molds, means for simultaneously moving said pivoted members toward and away from said fixed member to close and open said flask, and a core member having cores pivoted to said flask and adapted to be lowered into association with the molds of said flask.

6. In a pastry machine, a mold comprising a flask having a central fixed member and movable members disposed on either side thereof and pivoted thereto, said members each being provided with half mold depressions on their meeting faces, means for simultaneously moving said pivoted members toward and away from said fixed member to close and open said flask, said moving means being constructed and arranged to hold the parts locked in closed position, and a core plate having projecting cores adapted to enter said mold.

7. In a pastry machine, a mold comprising a flask having a central fixed member and movable members disposed on either side thereof and pivoted thereto, said members being provided on their meeting faces with half mold depressions, a rock shaft, links connecting said shaft and said movable members whereby the movable members may be simultaneously moved toward and away from said fixed member to close and open said flask, and a core plate having projecting cores adapted to enter said mold.

8. In a pastry machine, a mold comprising a flask having a central fixed member and movable members disposed on either side thereof and pivoted thereto at the lower portion thereof, said members being provided on their meeting faces with half mold depressions coöperating when the flask is closed to form complete molds, manually operable means for simultaneously moving said pivoted members toward and away from said fixed member to close and open said flask and for holding the same in closed position, and a core plate having projecting cores and pivoted to said fixed flask member, said cores adapted to enter said molds in one position of said core plate.

9. In a pastry machine, a frame, a mold mounted in said frame and comprising a flask having a central fixed member and movable members disposed on either side thereof and pivoted thereto, said members being provided on their meeting faces with half mold depressions coöperating when the flask is closed to form complete molds, a rock shaft journaled in the said fixed member, links connecting said shaft and said movable members for conjunctively moving said pivoted members toward and away from said fixed member to close and open said flask, and a core plate having projecting cores and pivoted to said fixed flask member, said cores adapted to enter said molds in one position of said core plate.

10. In a pastry machine, a mold having a flask member, a core plate pivoted thereto, and a device for locking said core plate to said flask member under pressure comprising an eccentric cam pivoted to said core plate, a handle for operating the cam and a locking dog actuated by said cam and adapted to engage a portion of said flask.

11. In a pastry machine, a mold having flask members movable relative to each other, an operating means for moving said members to and from each other, a core plate mounted to move into and out of association with said flask members, and a locking device comprising an eccentric cam pivoted to said core plate, a handle for operating said cam and a locking dog actuated by said cam and adapted to engage said operating means whereby said core plate and said flask members are locked in association under pressure.

12. In a pastry machine, a mold comprising a flask having a central fixed member and movable members disposed on either side thereof and pivoted thereto, said members being provided on their meeting faces with half mold depressions coöperating when the flask is closed to form complete molds, crank and link connections for simultaneously swinging said pivoted members toward and away from said fixed member to close and open said flask, a bracket secured to said fixed flask member, a core plate having projecting cores and pivoted to said bracket, said cores adapted to enter said molds in one position of said core plate, and a handle for manipulating said core plate, said handle being provided with a locking element.

13. In a pastry machine, a frame, a mold mounted therein, said mold comprising a central fixed member having end flanges, and movable members disposed on either side thereof, pivots joining said movable members to said fixed member, threaded studs depending from said flanges, flame deflectors mounted on said studs beneath said pivots, nuts securing said deflectors to said studs, and gas burners supported by said frame beneath said deflectors.

14. In a pastry machine, a frame comprising a sheet metal oven, angle bar supports therefor bolted to said oven at its vertical edges, a heat insulating lining for said oven, a mold removably supported in said oven and a removable cover for closing that side of said oven through which the mold is inserted.

15. In a pastry machine, a frame comprising a sheet metal oven, angle bar supports therefor bolted to said oven at its vertical edges, an asbestos lining for said oven, a mold removably supported in said oven, said mold comprising a flask member and a core plate pivoted thereto, and a cover for closing that side of said oven through which the mold is inserted therein, said covering being carried by said core plate.

16. In a pastry machine, a frame comprising a sheet metal oven, angle bar supports therefor, secured to the vertical edges of said oven, two of said supports extending above the upper edge of said oven, a rod carried by the upper ends of said supports, a sheave wheel carried by said rod, a mold comprising a flask member and a core plate pivoted thereto, a counter weight, and a cable passing over said sheave wheel and connecting said weight and said core plate.

17. In a pastry machine, a frame comprising a sheet metal oven, supports therefor, a plurality of molding units removably supported in said oven, each said unit comprising a flask member and a core plate pivoted thereto, and a cover for the open side of said oven made in sections, a section of said cover carried by each core plate and of greater lateral extent than said core plate.

18. In a pastry machine, a mold comprising a flask having members pivoted together, said members having half mold depressions on their meeting faces coöperating when the flask is closed to form complete molds, an operating rod passing through one of said members and means for adjusting said rod into parallelism with the meeting faces of said flask.

19. In a pastry machine, a mold comprising a flask having members pivoted together, said members having half mold depressions on their meeting faces coöperating when the flask is closed to form complete molds, end flanges for one of said members, alined openings in said flanges, eccentric bushings adjustable in said openings, and an operating rod inserted through said bushings, said eccentric bushings adapted to position said rod relative to the meeting faces of the flask to insure a uniform closure throughout the length of the flask.

20. In an ice-cream cone machine, a mold comprising a flask having members pivoted together, said members having half conical mold depressions on their meeting faces coöperating when the flask is closed to form complete conical molds having their apices at the bottom of the flask, and stripper fingers provided with depressions forming the entire tips of the conical molds positioned on one of said members for stripping the molded pastry from the mold.

21. In an ice-cream cone machine, a mold comprising a flask having members pivoted together, said members having conical depressions on their meeting faces coöperating when the flask is closed to form complete conical molds having their apices at the bottom of the flask, the conical depressions in one of said members being arranged to form one entire longitudinal half section and the entire tip of the cone, and the conical depressions in said other member being arranged to form the remaining half section of the cone.

Signed by me at Boston, Massachusetts, this third day of June, 1919.

JULIUS B. MELTZ.